United States Patent
Hamlin et al.

(10) Patent No.: US 11,755,738 B2
(45) Date of Patent: Sep. 12, 2023

(54) PLATFORM FRAMEWORK SECURITY STATE MANAGEMENT

(71) Applicant: Dell Products, L.P., Round Rock, TX (US)

(72) Inventors: Daniel L. Hamlin, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 282 days.

(21) Appl. No.: 17/355,302

(22) Filed: Jun. 23, 2021

(65) Prior Publication Data
US 2022/0414221 A1 Dec. 29, 2022

(51) Int. Cl.
G06F 21/57 (2013.01)
G06F 21/84 (2013.01)
G06F 21/32 (2013.01)

(52) U.S. Cl.
CPC .............. *G06F 21/57* (2013.01); *G06F 21/32* (2013.01); *G06F 21/84* (2013.01); *G06F 2221/034* (2013.01); *G06F 2221/2111* (2013.01)

(58) Field of Classification Search
CPC .......... G06F 21/57; G06F 21/32; G06F 21/84; G06F 2221/034; G06F 2221/2111; H04L 63/1433; H04L 63/20
See application file for complete search history.

(56) References Cited

U.S. PATENT DOCUMENTS

| | | | |
|---|---|---|---|
| 2011/0161848 A1* | 6/2011 | Purcell | H04L 63/1416 715/764 |
| 2016/0088019 A1* | 3/2016 | Li | H04L 63/20 726/1 |
| 2020/0389491 A1* | 12/2020 | Buck | H04L 63/1466 |

* cited by examiner

*Primary Examiner* — Nelson S. Giddins
(74) *Attorney, Agent, or Firm* — Fogarty LLP

(57) ABSTRACT

Embodiments of systems and methods for platform framework security state management are described. In some embodiments, an Information Handling System (IHS) collects context information that describes logical and physical environments in which the IHS is operating. This context information is used to determine a security state for the IHS. A launch of a resource of the IHS is detected. In response, updated context information is collected that further describes the logical and physical environments. Based on the security state, the launched resource and the updated context information, an updated security state of the IHS is determined. Based on the updated security state, changes are determined to security policies that are used to operate hardware devices of the IHS. Platform framework participants are identified that are registered users of the security polices affected by the updated security state, and these participants are notified of the security policy changes.

20 Claims, 4 Drawing Sheets

PLATFORM FRAMEWORK SECURITY STATE MANAGEMENT

FIELD

The present disclosure relates generally to Information Handling Systems (IHSs), and more particularly, to systems and methods for supporting the use of various internal components of IHSs.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for platform framework security state management are described. In an illustrative, non-limiting embodiment, an Information Handling System (IHS) may include a plurality of hardware devices, each operated at least in part according to one or more security policies and each operated by one or more registered participants of a platform framework. IHS embodiments may further include a processor and a memory coupled to the processor, the memory having program instructions stored thereon that, upon execution, cause the IHS to: collect context information describing logical and physical environments in which the IHS is operating, wherein the context information is used to determine a security state for the IHS; detect a launch of a resource of the IHS; in response to the detected resource launch, collect updated context information further describing the logical and physical environments in which the IHS is operating; based on the security state, the launched resource and the updated context information, determine an updated security state for the IHS; based on the updated security state for the IHS, determine changes to one or more security policies that are used to operate the hardware devices of the IHS; identify platform framework participants that are registered users of the security polices affected by the changes resulting from the updated security state; and notify the identified platform framework participants of changes to the security policies that are to be used to operate the hardware devices of the IHS.

In additional IHS embodiments, the launched resource comprises at least one of a file and a software application. In additional IHS embodiments, the launched resource comprises a containerized workspace. In additional IHS embodiments, each respective security policy comprises a plurality of communication handles for use in notifying the identified platform framework participants of the changes to the security policy. In additional IHS embodiments, the one or more security policies comprise a policy specifying a type of proximity determination that is utilized by user presence detection capabilities of the IHS. In additional IHS embodiments, the plurality of hardware devices comprises a time-of-flight sensor, and wherein the proximity determination types comprise detecting an individual within a specified distance of the IHS using the time-of-flight sensor. In additional IHS embodiments, the plurality of hardware devices comprises one or more displays, and wherein the one or more security policies comprise a policy specifying events that trigger a privacy capability of the one or more displays. In additional IHS embodiments, the privacy capability that is triggered comprises at least one of dimming the one or more displays and blurring outputs of the one or more displays. In additional IHS embodiments, the context information describing physical environments in which the IHS is operating comprises a location of the IHS. In additional IHS embodiments, the one or more security policies comprise a policy specifying a plurality of networks that are required for use when the IHS is at the location. In additional IHS embodiments, the one or more security policies comprise a policy specifying a requirement for user presence detection capabilities of the IHS to require biometric identification of a user when the IHS is at the location. In additional IHS embodiments, the one or more security policies comprise a policy disabling one or more I/O ports of the IHS when the IHS is at the location. In additional IHS embodiments, the one or more security policies comprise a policy enabling a camera of the IHS when the IHS is at the location of a scheduled event. In additional IHS embodiments, the context information describing physical environments in which the IHS is operating comprises operation of the IHS at the location of a scheduled event. In additional IHS embodiments, the context information describing physical environments in which the IHS is operating comprises operation of the IHS using an external monitor and further comprises detection of multiple individuals in proximity to the IHS, and wherein the one or more security policies comprise a policy that initiates a privacy capability of the IHS.

In various additional embodiments, memory storage devices include program instructions stored thereon that, upon execution by an Information Handling System (IHS), cause the IHS to: collect context information describing logical and physical environments in which the IHS is operating, wherein the context information is used to determine a security state for the IHS; detect a launch of a resource of the IHS; in response to the detected resource launch, collect updated context information further describing the logical and physical environments in which the IHS is operating; based on the security state, the launched resource and the updated context information, determine an updated security state for the IHS; based on the updated security state for the IHS, determine changes to one or more security policies that are used to operate hardware devices of the IHS; identify platform framework participants that are registered users of the security polices affected by the changes resulting from the updated security state; and notify the identified platform framework participants of changes to the security policies that are to be used to operate the hardware devices of the IHS. In additional storage device embodiments, the launched resource comprises at least one of a file and a software application. In additional storage device embodiments, the launched resource comprises a containerized workspace.

In various additional embodiments, methods may include: collecting context information describing logical and physical environments in which an IHS (Information Handling System) is operating, wherein the context information is used to determine a security state for the IHS; detecting a launch of a resource of the IHS; in response to the detected resource launch, collecting updated context information further describing the logical and physical environments in which the IHS is operating; based on the security state, the launched resource and the updated context information, determining an updated security state for the IHS; based on the updated security state for the IHS, determining changes to one or more security policies that are used to operate hardware devices of the IHS; identifying platform framework participants that are registered users of the security polices affected by the changes resulting from the updated security state; and notifying the identified platform framework participants of changes to the security policies that are to be used to operate the hardware devices of the IHS. In additional method embodiments, the launched resource comprises at least one of a file and a software application.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
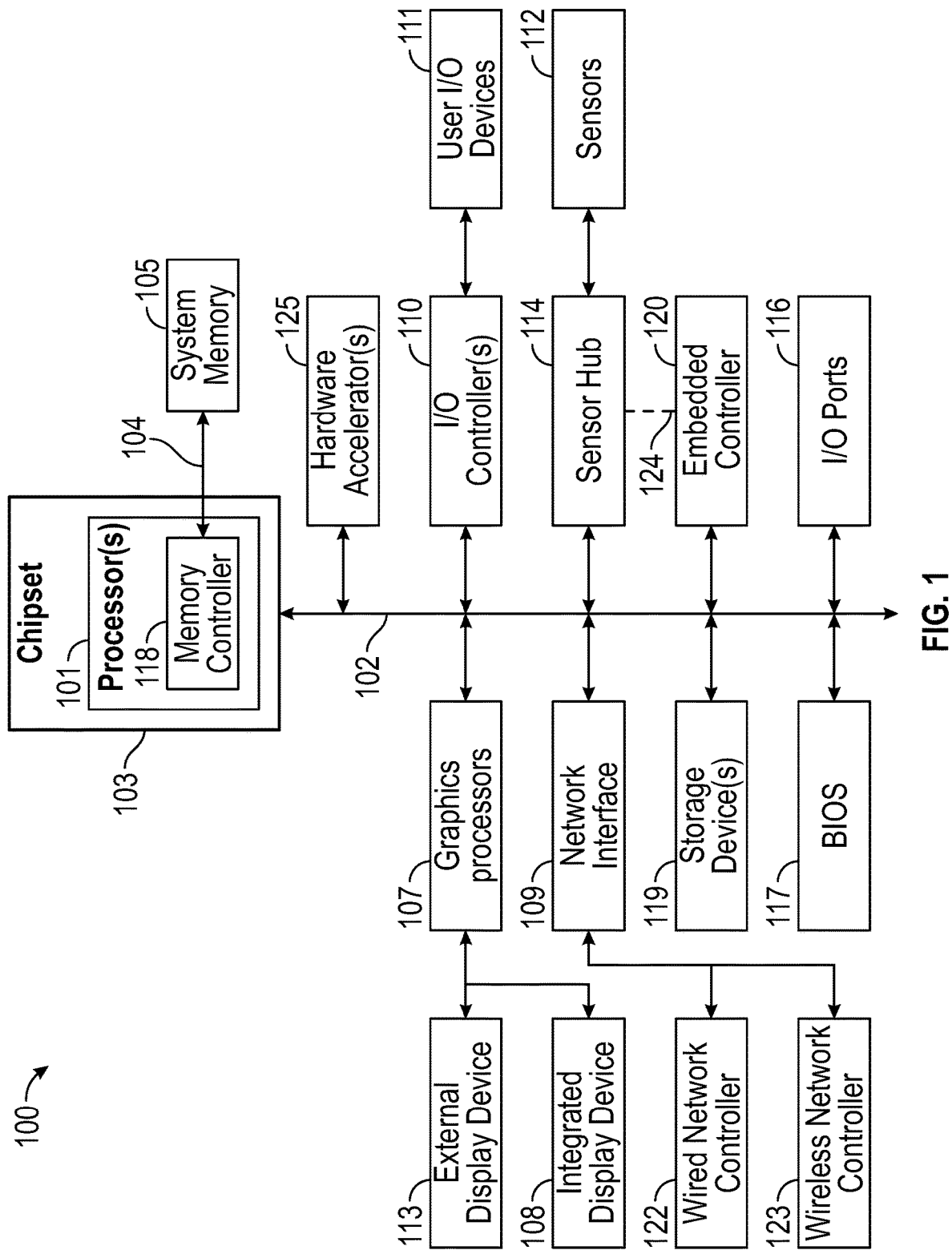
FIG. 1 is a block diagram of an example of hardware components of an Information Handling System (IHS) configured to support management of security states for use in the operation of platform framework resources of the IHS, according to some embodiments.

FIG. 1 is a block diagram illustrating components of IHS 100 configured to support management of security states for use in the operation of platform framework resources of the IHS 100. As shown, IHS 100 includes one or more processor(s) 101, such as a Central Processing Unit (CPU), that execute code retrieved from system memory 105. Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor (ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102. In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

In some cases, one or more sensors 112 may be part of a keyboard or other input device. Processor(s) 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor(s) 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a display 108 may be facing the user at an obtuse angle with respect to a second display surface of a display 108 or a physical keyboard portion. In a tablet posture, a first display surface may be at a straight angle with respect to a second display surface or a physical keyboard portion. And, in a book posture, a first display surface may have its back (e.g., chassis) resting against the back of a second display surface or a physical keyboard portion.

It should be noted that the aforementioned postures and their various respective keyboard states are described for sake of illustration only. In different embodiments, other postures may be used, for example, depending upon the type of hinge coupling the displays, the number of displays used, or other accessories.

In other cases, processor(s) 101 may process user presence data received by sensors 112 and may determine, for example, whether an IHS's end-user is present or absent. Moreover, in situations where the end-user is present before IHS 100, processor(s) 101 may further determine a distance of the end-user from IHS 100 continuously or at predetermined time intervals. The detected or calculated distances may be used by processor(s) 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor(s) 101 may receive and/or produce context information using sensors 112 via sensor hub 114, including one or more of, for example: a user's presence or proximity state (e.g., present, near-field, mid-field, far-field, and/or absent using a Time-of-Flight or "ToF" sensor, visual image sensor, infrared sensor, and/or other suitable sensor 112), a facial expression of the user (e.g., usable for mood or intent classification), a direction and focus of the user's gaze, a user's hand gesture, a user's voice, an IHS location (e.g., based on the location of a wireless access point or Global Positioning System, etc.), IHS movement (e.g., from an accelerometer or gyroscopic sensor), lid state (e.g., of a laptop or other hinged form factor), hinge angle (e.g., in degrees), IHS posture (e.g., laptop, tablet, book, tent, display, etc.), whether the IHS is coupled to a dock or docking station (e.g., wired or wireless), a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., by determine whether or not the user is holding a stylus, or the like), a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source (e.g., whether the IHS is operating in AC-only mode, DC-only mode, or AC+DC mode), a power mode or rate of power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor(s) 101, and it may communicate with chipset 103 via a bus connection such as an Inter-Integrated Circuit (I²C) bus or other suitable type of bus connection. Sensor hub 114 may also utilize an I²C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

As described in additional detail below, in some embodiments, EC 120 may perform various functions to verify the integrity of IHS 100 and its hardware components prior to initialization of the IHS 100 (i.e., in a bare-metal state). For instance, EC 120 may calculate hash value signatures based on instructions and other information used to configure and operate hardware and/or software components of IHS 100, thus validating these components. For example, EC 120 may calculate a hash value based on firmware and on other instructions or settings utilized by a hardware component of IHS 100, such that the hardware component may be included within a root of trusted hardware of IHS 100. In some embodiments, the reference signatures used in such validations may be calculated and encoded in a secured storage of IHS 100 as part of a trusted manufacturing process of the IHS 100.

In various embodiments, chipset 103 may provide processor 101 with access to hardware accelerator(s) 125. Examples of hardware accelerator(s) 125 may include, but are not limited to, INTEL's Gaussian Neural Accelerator (GNA), Audio and Contextual Engine (ACE), Vision Processing Unit (VPU), etc. In some cases, hardware accelerator(s) 125 may be used to perform ML and/or AI operations offloaded by processor 101. For instance, hardware accelerator(s) 125 may load several audio signatures and/or settings, and it may identify an audio source by comparing an audio input to one or more audio signatures until it finds a match.

In some cases, however, hardware accelerator(s) 125 may have significant model concurrency and/or processing latency constraints relative to processor(s) 101. Accordingly, in some cases, context information may be used to select a subset and/or size of data signatures (e.g., audio), also number and/or complexity of models, number of concurrent models (e.g., only two or three models can be processed at a time), and/or latency characteristics (e.g., with 4 signatures or more, detection latency becomes unacceptable) of hardware accelerator(s) 125.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

In a conventional IHS, each application would have to know how to communicate with each specific hardware endpoint 101-124 it needs, which can place a heavy burden on software developers. Moreover, in many situations, multiple applications may request the same information from the same hardware endpoint, thus resulting in inefficiencies due to parallel and/or overlapping code and execution paths used by these applications to perform get and set methods with that same endpoint.

To address these, and other concerns, a platform framework as described herein may enable an overall, comprehensive system management orchestration of IHS 100. Particularly, such a platform framework may provide, among other features, the scalability of multiple applications requesting direct hardware endpoint (e.g., 101-124) access. Additionally, or alternatively, a platform framework as described herein may provide performance optimizations and increased operational stability to various IHS environments.

Figure 2:
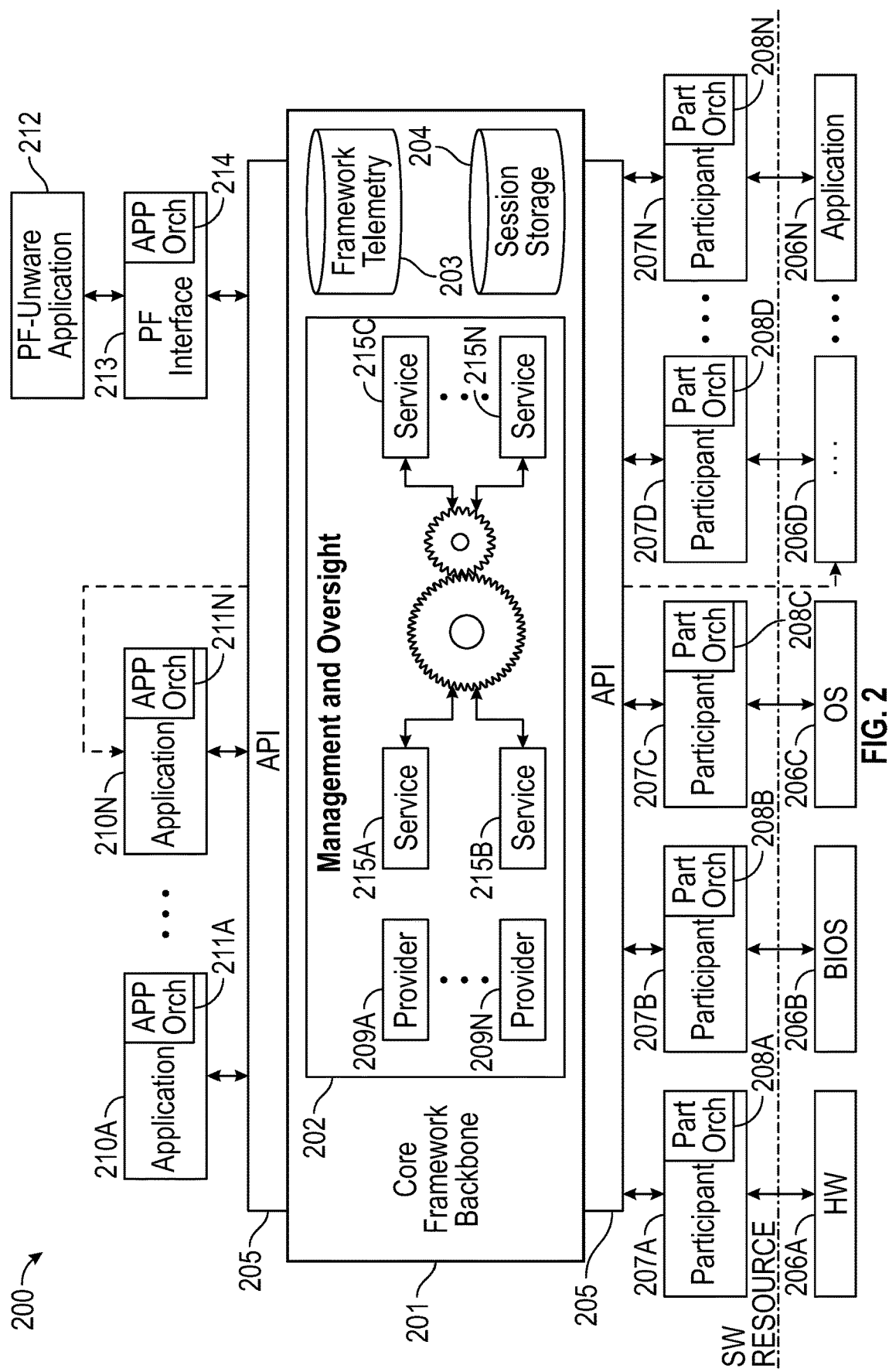
FIG. 2 is a block diagram illustrating an example of a platform framework deployed in an IHS in a manner that supports management of security states for use in the operation of platform framework resources, according to some embodiments.

FIG. 2 is a block diagram illustrating an example of platform framework 200 that may be configured to support management of security states for use in the operation of platform framework resources of an IHS. In some embodiments, IHS 100 may instantiate each element of platform framework 200 through the execution of program instructions, stored in a memory (e.g., system memory 105, storage device(s) 119, etc.), by one or more processors or controllers (e.g., processor(s) 101, GPU 107, hardware accelerators, etc.). In some implementations, platform framework 200 may be supported by and/or executed within an OS used by IHS 100, and it may be scaled across user and kernel spaces. Additionally, or alternatively, platform framework 200 may be provided as a software library or an ".exe" file. As shown, platform framework 200 includes core framework backbone 201 and Application Programming Interface (API) 205. Core framework backbone 201 includes management and oversight engine 202 (with services 215A-N), framework telemetry database 203, and session storage database 204.

In operation, platform framework 200 enables the management and orchestration of its participants' communications. The term "participant," as used herein, refers to any entity (e.g., hardware device driver, software module, etc.) configured to register with platform framework 200 by issuing a registration command to management and oversight engine 202 via API 205. Upon registration, each participant may receive a handle usable by services 215A-N within management and oversight engine 202 (and other participants) to address it. In some cases, the handle may be validated by Root-of-Trust (RoT) hardware (e.g., EC 120) as part of the participant registration process. In some instances, the platform framework 200 may provide a handle received from a participant to other validated participants, thus supporting the ability for various types of participants to communicate directly with each other. For example, a handle provided to the platform framework 200 may include a reference to an IPC (Inter-Process Communications) resource of the IHS that is to be used in API communications supported by the participant providing the handle.

In various embodiments, platform framework 200 may include at least three different types of participants: producers, consumers, and providers. Producers are entities (e.g., 207A-N) configured to advertise or publish the capabilities (e.g., variables, primitives, etc.) and statuses of associated hardware (e.g., 206A) or software components (e.g., 206N) to platform framework 200 via API 205, which can then be consumed and/or modified by other participants (e.g., 210A-N). Producers (e.g., 207A-N) may also execute operations with respect to associated hardware components (e.g., 206A-N) based upon instructions (e.g., "set" commands) received from other participants (e.g., 210A-N) via API 205.

On the producer side, resources 206A-N may include, for example, hardware 206A, BIOS 206B, OS 206C, application 206D (a producer role for consumer application 210N), and application 206N (a producer-only application). Each of resources 206A-N may have a producer driver or module 207A-N (a "producer") associated therewith, and each such producer 207A-N may have corresponding orchestrator logic 208A-N that enables its registration and subsequent communications with platform framework 200 via API 205. Once registered, producers 207A-N may provide information to platform framework 200 on their own, upon request by management and oversight engine 202, and/or upon request by any consumer (e.g., 210A-N).

Consumers are entities (e.g., 210A-N) that retrieve data (e.g., a single data item, a collection of data items, data subscribed to from selected producers, etc.) from platform framework 200 using API 205 to then perform one or more actions. On the consumer side, each of consuming applications 210A-N (a "consumer") may have a corresponding orchestrator logic 211A-N that also enables registration and subsequent communications with platform framework 200 using API 205. For example, applications 210A-N may use API 205 commands request data via platform framework 200 from any registered producer 207A-N or provider 209A-N. In the case of application 212 that is not natively aware of, or compliant with, platform framework 200 (e.g., the application uses direct-to-driver access), interface application or plugin 213 and orchestrator logic 214 may enable its inter-operation with platform framework 200 via API 205.

In various embodiments, orchestrator logic 208A-N, 211A-N, and 214 are each a set of APIs to manage a respective entity, such as applications 211A-N, participants 207A-N, and PF interface 213. Particularly, each entity may use its orchestrator interface to register themselves against platform framework 200, with a list of methods exposed within the orchestrator logic's APIs to query for capabilities, events to listen/respond on, and other orchestration operations tied to routing and efficiency.

In some cases, a single application may operate both as a consumer and a producer with respect to platform framework 200. For example, application 210N may operate as a consumer to receive BIOS data from BIOS 206B via API 205. In response to receiving data from producer 207B associated with BIOS 206B, application 210N may execute one of more rules to change the IHS 100's thermal settings. As such, the same application 210N may also operate as producer 206D, for example, by registering and/or advertising its thermal settings to platform framework 200 for consumption by other participants (e.g., 210A) via API 205.

Providers 209A-N are runtime objects that collect data from multiple participants and make intelligent modifications to that data for delivery to other participants (e.g., consumers) through platform framework 200. Despite a provider (e.g., 209A) being an entity within management and oversight engine 202, it may be registered and/or advertised with platform framework 200 as if it were one of producers 207A-N.

As an example, a status provider (e.g., 209A) may collect hardware information from hardware resource(s) 206A and BIOS information (e.g., from BIOS 206B), make a status determination for IHS 100 based upon that data, and deliver the status to platform framework 200 as if it were a hardware component or driver. As another example, a status provider (e.g., 209A) may receive user presence information from sensor hub 114 (e.g., hardware 206A), receive human interface device (HID) readings from OS 209C, make its user own presence determination based upon some concatenation of those two inputs, and publish its user presence determination to platform framework 200 such that other participants do not have to make redundant findings.

API 205 may include a set of commands commonly required of every participant (consumers and producers) of platform framework 200, for example, to perform get or set operations or methods. Predominantly, producers 207A-N may use API 205 to register, advertise, and provide data to consumers (e.g., 210A-N), whereas consumers 210A-N may use API 205 to receive that data and to send commands to producers 207A-N.

Moreover, applications 210A-N may discover all other participants (e.g., hardware 206A and enumerated/supported capabilities, etc.) that are registered into platform framework 200 using API 205. For example, if hardware 206A includes graphics subsystem 107, application 210A may use API 205 to obtain the firmware version, frame rate, operating temperature, integrated or external display, etc. that hardware 206A provides to platform framework 200, also via API 205.

Applications 210A-N may use information provided by platform framework 200 entirely outside of it, and/or they may make one or more determinations and configure another participant of platform framework 200. For example, application 210A may retrieve temperature information provided by hardware 206A (e.g., GPU 107), it may determine that an operating temperature is too high (i.e., above a selected threshold), and, in response, it may send a notification to BIOS 206B via producer 207B to configure the IHS's thermal settings according to a thermal policy. It should be noted that, in this example, by using API 205, application 210A does not need to have any information or knowledge about how to communicate directly with specific hardware 206A and/or BIOS component 206B.

In various implementations, API 205 may be extendable. Once a participant subscribes to, or registers with, platform framework 200 via API 205, in addition to standard commands provided by API 205 itself (e.g., get, set, discovery, notify, multicast, etc.), the registered participant may also advertise the availability of additional commands or services. For instance, express sign-in and/or session management application 210A, thermal policy management application 210B, and privacy application 210C may each need to obtain information from one or more user presence/proximity sensors (e.g., sensors 112) participating in platform framework 200 as hardware providers 206A. In this case, the extensibility of API 205 may allow for the abstraction and arbitration of two or more sensors 112 at the platform framework 200 layer; instead of having every application 210A-C reach directly into sensors 112 and potentially crash those devices and/or driver stacks (e.g., due to contention).

As another example, raw thermal and/or power information may be provided into platform framework 200 by one or more sensors 112 as hardware producers 207A and consumed by two or more applications, such as thermal management application 210A and battery management application 210B, each of which may subscribe to that information, make one or more calculations or determinations, and send responsive commands to BIOS 206C using API 205 in the absence of any specific tools for communicate directly with hardware 206A or BIOS 206B.

As yet another example, provider 209A may communicate with an application 211A, such as a battery management application or OS service, and it may set application or OS service 211A to a particular configuration (e.g., a battery performance "slider bar") using API 205 without specific knowledge of how to communicate directly with that application or OS service, and/or without knowing what the application or OS service is; thus platform framework 200 effectively renders provider 209A application and/or OS agnostic.

Within core framework backbone 201, management and oversight engine 202 includes services 215A-N within platform framework 200 that may be leveraged for the operation of all participants. Examples of services 215A-N include, but are not limited to: registration (e.g., configured to enable a participant to register and/or advertise data with platform framework 200), notification (e.g., configured to notify any registered participant of a status change or incoming data), communication/translation between user and kernel modes (e.g., configured to allow code executing in kernel mode to traverse into user mode and vice-versa), storage (e.g., configured to enable any registered participant to store data in session storage database 204), data aggregation (e.g., configured to enable combinations of various status changes or data from the same or multiple participants), telemetry (e.g., configured to enable collection and storage of data usable for monitoring and debugging), arbitration (e.g., configured to enable selection of one among two or more data sources or requests based upon an arbitration policy), manageability (e.g., configured to manage services 215A-N and/or databases 203/204 of platform framework 200), API engine (e.g., configured to extend or restrict available commands), etc.

Framework telemetry database 203 may include, for example, an identification of participants that are registered, data produced by those participants, communication metrics, error metrics, etc. that may be used for tracking and debugging platform framework 200. Session storage database 204 may include local storage for sessions established and conducted between different participants (e.g., data storage, queues, memory allocation parameters, etc.).

In some implementations, a containerized workspace and/or an application executed therewithin may participate as a producer (e.g., 207A-N/206A-N) or as a consumer (e.g., 210A-N) of platform framework 200. Particularly, IHS 100 may be employed to instantiate, manage, and/or terminate a secure workspace that may provide the user of IHS 100 with access to protected data in an isolated software environment in which the protected data is segregated from: the OS of IHS 100, other applications executed by IHS 100, other workspaces operating on IHS 100 and, to a certain extent, the hardware of IHS 100. In some embodiments, the construction of a workspace for a particular purpose and for use in a particular context may be orchestrated remotely from the IHS 100 by a workspace orchestration service. In some embodiments, portions of the workspace orchestration may be performed locally on IHS 100.

In some embodiments, EC 120 or a remote access controller (RAC) coupled to processor(s) 101 may perform various operations in support of the delivery and deployment of workspaces to IHS 100. In certain embodiments, EC 120 may interoperate with a remote orchestration service via the described out-of-band communications pathways that are isolated from the OS that runs on IHS 100. In some embodiments, network adapter that is distinct from the network controller utilized by the OS of IHS 100 may support out-of-band communications between EC 120 and a remote orchestration service. Via this out-of-band signaling pathway, EC 120 may receive authorization information that may be used for secure delivery and deployment of a workspace to IHS 100 and to support secure communication channels between deployed workspaces and various capabilities supported by IHS 100, while still maintaining isolation of the workspaces from the hardware and OS of IHS 100.

In some embodiments, authorization and cryptographic information received by EC 120 from a workspace orchestration service may be stored to a secured memory. In some embodiments, EC 120 may access such secured memory via an I2C sideband signaling pathway. EC 120 may support execution of a trusted operating environment that supports secure operations that are used to deploy a workspace on IHS 100. In certain embodiments, EC 120 may calculate signatures that uniquely identify various hardware and software components of IHS 100. For instance, remote EC 120 may calculate hash values based on instructions and other information used to configure and operate hardware and/or software components of IHS 100. For instance, EC 120 may calculate a hash value based on firmware and on other instructions or settings of a component of a hardware component. In some embodiments, hash values may be calculated in this manner as part of a trusted manufacturing process of IHS 100 and may be stored in the secure storage as reference signatures used to validate the integrity of these components later. In certain embodiments, a remote orchestration service supporting the deployment of workspaces to IHS 100 may verify the integrity of EC 120 in a similar manner, by calculating a signature of EC 120 and comparing it to a reference signature calculated during a trusted process for manufacture of IHS 100.

EC 120 may execute a local management agent configured to receive a workspace definition from the workspace orchestration service and instantiate a corresponding workspace. In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of a security context (e.g., location, patch level, threat information, network connectivity, etc.) and a productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 configured for operation with the workspace orchestration service.

In specifying capabilities and constraints of a workspace, a workspace definition (e.g., in the form of an XML, file, etc.) may prescribe one or more of: authentication requirements for a user, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), workspace capabilities available to independently attach other resources, whether or not the workspace supports operability across distinct, distributed instances of platform framework 200 (e.g., by including or excluding an identity of another platform framework, or an identity of another workspace with access to a platform framework).

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then the workspace orchestration service may autonomously add that application to the default workspace definition for that user.

During operation, as an instantiated workspace is manipulated by a user, new productivity and security context information related to the behavior or use of data may be collected by the local management agent, thus resulting in a change to the productivity or security context of the workspace. To the extent the user's behavioral analytics, device telemetry, and/or the environment has changed by a selected degree, these changes in context may serve as additional input for a reevaluation, and the result may trigger the remote orchestration service to produce a new workspace definition (e.g., adding or removing access to the workspace as a consumer or producer to an external or distributed platform framework), extinguish the current workspace, and/or migrate contents of the current workspace to a new workspace instantiated based on the new workspace definition.

In some cases, platform framework 200 may be extensible or distributed. For example, different instances or portions of platform framework 200 may be executed by different processing components (e.g., processor(s) 101 and EC 120) of IHS 100, or across different IHSs. Additionally, or alternatively, independent instances of platform framework 200 may be executed by different workspaces and in secure communications with each other, such that a participant, service, or runtime object's handle may identify the particular platform framework 200 that the participant or service is registered with. Services between these different instances of platform networks may communicate with each other via an Interprocess Communication (IPC) resource specified in a handle provided by the workspace orchestration service for communications with the workspace(s) involved.

In some cases, the workspace definition of a workspace may specify that the workspace: instantiate its own a platform framework, use a platform framework instantiated within another workspace (in the same or different IHS), and/or use a combination of different instances of platform frameworks (one or more of which may be instantiated by another workspace). Moreover, the platform framework option as prescribed by a workspace definition may be based upon the resolution of any of the aforementioned contextual rules (e.g., based on IHS posture, location, user presence, etc.).

As used herein, the term "runtime object" refers to a piece of code (e.g., a set of program instructions) or information that can be instantiated and/or executed in runtime without the need for explicit compilation. For example, in the context of an arbitration operation, the code that executes the arbitration may already be complied, whereas the polic(ies)

that the code enforces may change at runtime (e.g., by a user's command in real time) and therefore may be considered "runtime objects."

Figure 3:
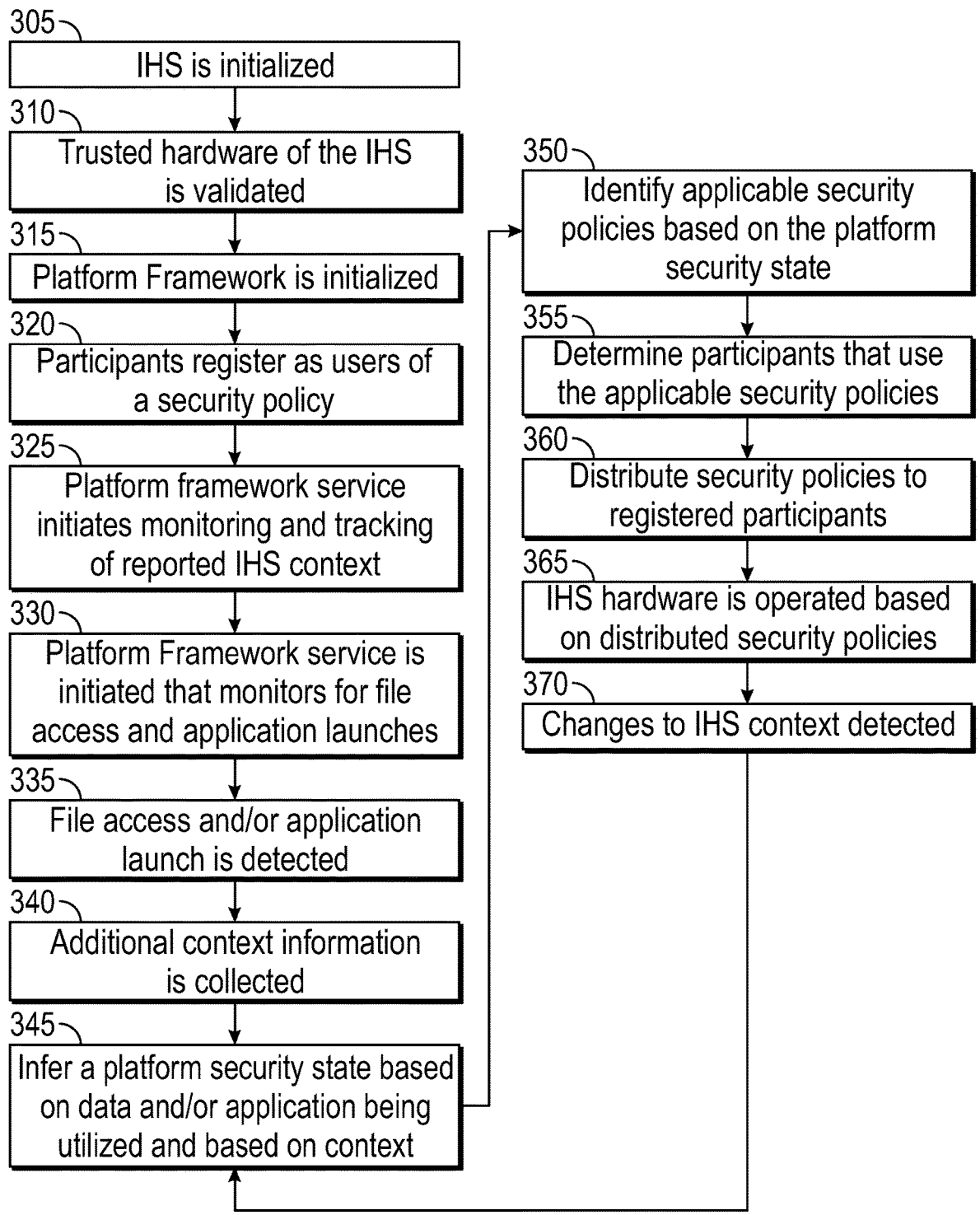
FIG. 3 is a flowchart illustrating an example of a method for supporting management of security states for use in the operation of platform framework resources of an IHS, according to some embodiments.

FIG. 3 is a flowchart illustrating an example of a method, according to various embodiments, for management of security states for use in the operation of platform framework resources of an IHS. Some embodiments may begin at block 305 with the initialization of an IHS, such as described with regard to FIG. 1. In some embodiments, procedures for initializing an IHS may include validation of various hardware components of the IHS, such as by the embedded controller of the IHS of FIG. 1. Accordingly, at block 310, the firmware instructions utilized by various hardware components may be validated against reference signatures for each respective component, thus confirming the hardware component is operating utilizing trusted instructions and is thus a trusted hardware component. Upon validating these hardware components such that they are included within a root of trust, an operating system of the IHS may be booted. With the operating system booted, at block 315, a platform framework for the IHS is initialized, where the platform framework provides a single interface for accessing various resources of the IHS, such as described with regard to FIG. 2.

Figure 4:
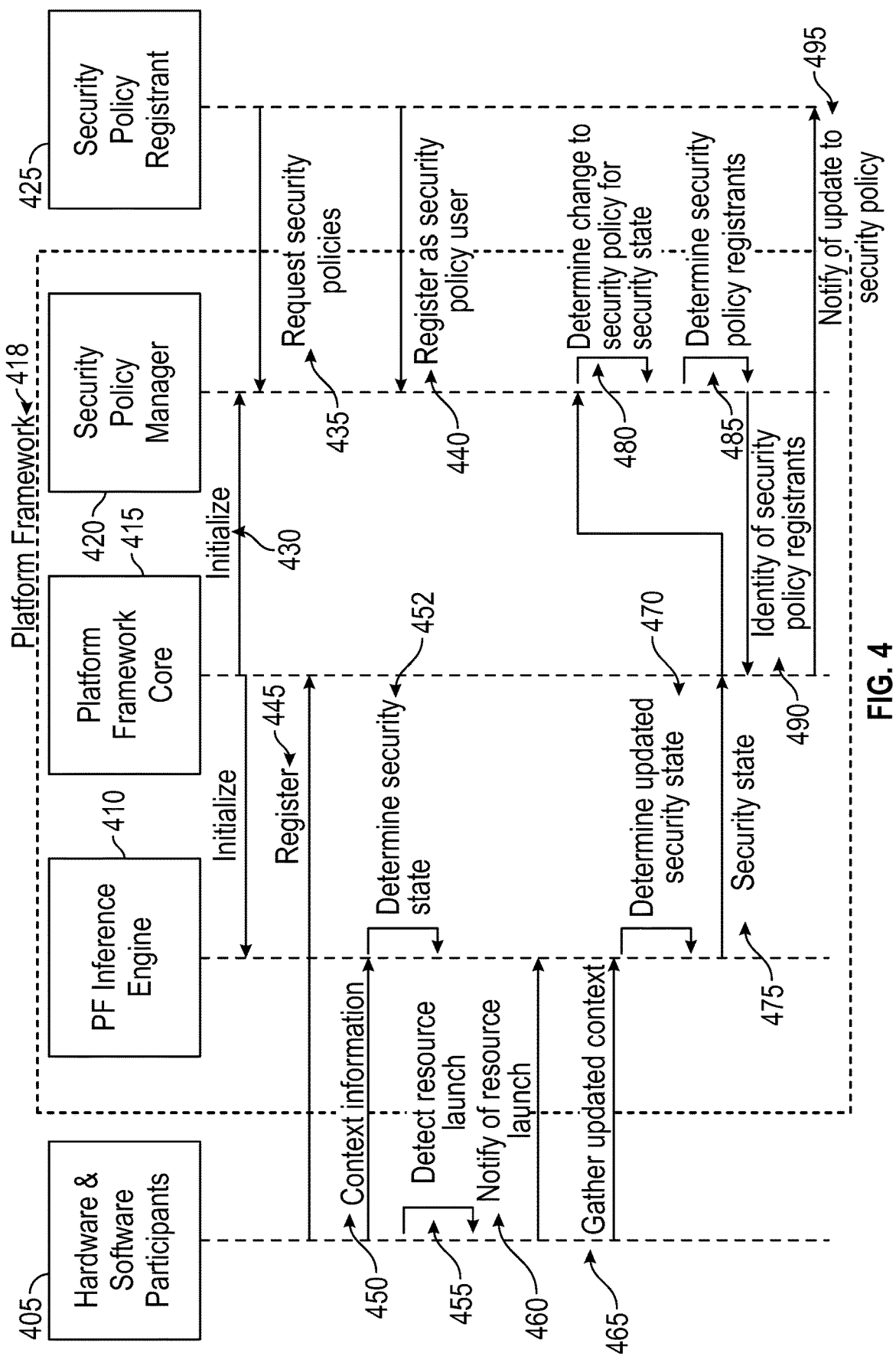
FIG. 4 is a message diagram illustrating certain operations of components of an IHS that are configured to support management of security states for use in the operation of platform framework resources of an IHS, according to some embodiments.

FIG. 4 is a message diagram illustrating certain operations of components of an IHS that are configured, according to various embodiments, to support management of security states for use in the operation of platform framework resources of an IHS. As indicated in FIG. 4, at 430, once the platform framework is initialized, the platform framework core 415 may initialize a security policy manager 420 that may operate as a service of the platform framework 418, such as the services of the management and oversight backbone of the platform framework core described with regard to FIG. 2. Upon its initialization, the security policy manager 420 may proceed to identify the operative security policies of the IHS. A variety of security policies may be utilized in operating hardware and/or software of an IHS. Security policies may specify settings that are used in the operation of hardware components of a platform, such as the IHS described with regard to FIG. 1. For instance, a security policy of an IHS may specify conditions or settings for operation of hardware-supported user presence detection capabilities of the IHS. In such instances, a security policy may specify a distance from the IHS in which a user must be detected by a time-of-flight sensor utilized by user presence detection capabilities in order to support a determination that the user is in proximity to the IHS. Based on a security policy, such a proximity determination may be used to increase the security requirements that are enforced in response to the IHS being utilized to access protected data. Such a security policy may additionally or alternatively specify a type of proximity determination that is required by a user presence detection capability, such as a determination that any individual can be detected in proximity to the IHS using a time-of-flight sensor of the IHS, or whether a specific user must be detected in proximity to the IHS using facial recognition operations on images captured using a camera of the IHS.

In some embodiments, a security policy may specify display settings to be utilized by one or more of the displays coupled to an IHS, such as the displays described with regard to FIG. 1. For instance, a security policy may specify events that trigger dimming the output of the displays such that displayed text is readable only to individuals in close proximity to the IHS, where the security policy may specify events that trigger dimming, such as based on user presence detection determinations, the information that is being viewed, or the location of the IHS. In this same manner, a security policy may additionally or alternatively specify events that trigger other privacy capabilities that are implemented by the displays, such as screen blurring, disabling use of external monitors, and placing the displays in a low-power mode with no displayed output. In some embodiments, such security policies may be monitored and utilized by a graphics controller, such as described with regard to FIG. 1, in implementing the policies.

In existing systems, applications that rely on such types of security policies encounter scenarios where the policies can be modified by various different components of an IHS, each operating independently from one another, thus resulting in conflicting security policies being generated by the different components. In addition, once a security policy has been selected and is in use, various conditions may change that signal a change in the context in which an IHS is operating, such as the location at which a portable IHS is being utilized, or such a change to the external networks that are being accessed using the IHS. The context in which an IHS operates may also change based on the data and/or applications that are being accessed. For instance, the use of an IHS to access protected data from a corporate data repository may signal a need for heightened security restriction. Due to such changes in context, the security polices in use may be constantly evolving and adapting to these changing conditions. Existing systems implement the use and updating of such policies in patchwork implementations that are error-prone and difficult to extend as new technologies become available. Embodiments support the ability for security policies to be adapted based on changes to the physical and logical environments in which an IHS is operated and further support the ability distribute such changes to the operative security policies to platform framework participants that are affected by these changes.

In some embodiments, the security policy manager 420 may maintain a repository of security policy definitions, such as XML files or other structured sources information, that identify the various security policies that are supported by an IHS that is configured according to embodiments. In some embodiments, the security policy definitions may also specify the settings of each particular policy that may be configured. In some embodiments, the security policy manager 420 may be configured to collect the known security policies upon its initialization, where the security policy manager 420 attempt to identify a valid security policy for each of the supported security policy definitions. In some embodiments, upon its initialization, the security policy manager 420 may query various components of the platform framework, operating system, and certain hardware, such as the embedded controller of FIG. 1, to identify the operative security policies. The security policy manager 420 may also include a repository of default security policies that are to be utilized each time the IHS is initialized, and that will be utilized until a security policy is modified, such as described herein.

With the operative platform policies identified upon initialization of the platform framework core 415, various operations of the IHS may continue, which may include the registration of various framework participants, such as described with regard to FIG. 2. As indicated at 320 of FIG. 3, the various operations may include the registration of a participant 425, such as described with regard to FIG. 2, as the user of one or more security policies supported by the platform framework 418. As indicated at 435 of FIG. 4, as part of this registration, the participant 425 may specify a request to the security policy manager 420 for the security policies that are supported by the platform framework 418. At 440, the participant 425 registers as a user of one or more of these supported security policies. In some embodiments, such security policy registrations may be supported by an API of the platform framework 418, such as described with regard to FIG. 2.

As describe above, hardware and software components of an IHS may be validated as authentic based on confirmation that instructions utilized by the component are identical to a set of trusted reference instructions for the component, where such reference instructions may be provided during assembly of an IHS, or from a trusted source, such as the embedded controller of FIG. 1. In some embodiments, the platform framework 418 may verify that a security policy registrant 425 that is requesting security policy information is validated in such a manner. In some embodiments, a security policy registrant 425 may submit a registration for use of a security policy along with a communication handle for use in communicating changes to this particular security policy to the registrant. In some embodiments, the submitted security policy registration request may also include a token. This token that is presented by a security policy registrant 425 may be validated as having been provided to the registrant by a trusted platform resource, thus authorizing the security policy registrant 425 to receive security policy information.

Upon receiving a security policy registration request from a participant 425, in some embodiments, the platform framework core 415 may validate the participant 425 that has issued the request, thus ensuring the registrant is a legitimate security component of the IHS. In some embodiments, the platform framework core 415 may validate that a token included in the registration by the participant 425 has been provided by a trusted resource of the IHS, such as the embedded controller of FIG. 1. In some embodiments, the platform framework core 415 may validate the instructions utilized by the registering participant against a reference signature, thus ensuring the participant 425 is operating using validated instructions. In response to the registration request from participant 425, the security policy manager 420 records the registrations. In support of this recording capability, the security policy manager 420 may maintain a repository that identifies registered participants 425 and also identifies the specific security policies that have been mapped to teach respective participant 425 and may also specify the communication handles for use in communicating security policy changes to registered participants.

With participants 425 registered as security policy users, various operations of the IHS may continue, which may include the registration of various additional framework participants, such as described with regard to FIG. 2. As indicated at 445 of FIG. 4, the various operations may include the registration of a participant 425, such as described with regard to FIG. 2, as a platform framework 418 participant, such as using an API supported by the platform framework core 415. In particular, these participants 405 may register as providers of security context information. As described, changes to the context in which an IHS operates, such as the location of the IHS or the individuals detected in proximity to the IHS, may constitute changes in the security context of the IHS, where such changes may require an update to the operative security policies in use by the IHS. Accordingly, the participants 405 registering as reporting security context information may base reported context information on information collected by a variety of hardware and software components of an IHS. As indicated at 325 of FIG. 3, upon registration of participants 405 providing context information, the platform framework may initiate monitoring and tracking of context information that is reported, at 450 of FIG. 4, to the platform framework 418.

Embodiments may track various types of context information pertaining to the logical and physical environments in which the IHS operations. In some embodiments, monitored contexts may include the physical location of the IHS. In such embodiments, the location of the IHS may be determined directly using location sensors of an IHS, such as a GPS sensor. Location context may also be inferred based on network information reported, such as based on an identifier of the wireless or wired network to which the IHS is currently coupled, in some cases reported by a network controller such as described with regard to FIG. 1. Location context may also be inferred based on triangulation from detected network access points, including location information provided by xR sensors. Changes in the location context of the IHS may result in changes to the security state of the IHS. For instance, a change from a secure corporate location in which only authorized individual are admitted to a public location where any individual other than the authenticated user of the IHS is presumed to be a malicious actor. In response to such a location context change, a change in security policies may be triggered that requires more restrictive user presence detection and authentication requirements to be utilized. In response to such a location context change, a change in security policies may be triggered that requires use of specific networks, such as encrypted networks, in locations where such a network is available. Such security policies may further specify that certain capabilities of the IHS may be enabled when coupled to a particular encrypted network, such as accessing certain data stores without use of a VPN. In some embodiments, a change in the location context from a low-risk location to a high-risk location may trigger the use of security policies that require positive biometric identification of a specific authenticated individual by the user presence detection capabilities of the IHS in order to continue use of the IHS. In some embodiments, such security policies may be specified within a workspace definition utilized to build and operate a containerized workspace that is intended to provide access to protected information.

In some embodiments, monitored contexts may include user presence detection information that is being reported based on the various sensors of the IHS that may be used to detect the presence of an individual within a proximity to the IHS, such as time-of-flight sensors, motion sensors, cameras, near-field network controllers (e.g., Bluetooth), RFID sensors, and xR sensors. Changes in the user presence detection context of the IHS may result in changes to the security state of the IHS. For instance, the detection of an unidentified user in close proximity to the IHS while accessing highly protected data, especially when the IHS is located in a high-risk location in which a public network is in use, may trigger more restrictive privacy controls, such as dimming and/or blurring of the output displayed by the monitors of the IHS. In other instance, the detection of a specify authenticated individual, such as using facial recognition capabilities that utilize a camera of the IHS, may result in the relaxing of privacy controls that alter the displayed output of the IHS. In some embodiments, the detection of multiple individuals in close proximity to the IHS may trigger more restrictive privacy controls, unless the IHS is at a known low-risk location.

In some embodiments, monitored contexts may include network information that is being reported by network controllers of the IHS, such as described with regard to FIG. 1. Changes in the network context of the IHS may result in changes to the security state of the IHS. For instance, the detection of the IHS being coupled to an unrecognized or otherwise designated high-risk network may disable certain functions of the IHS, such as use of one or more physical I/O ports of the IHS. In other embodiments, functions of the IHS that may disabled while coupled to the high-risk network may disable certain file transfer capabilities of the IHS and/or use of a web browser by the IHS.

In some embodiments, monitored contexts may include calendar or other schedule information that may be reported by one or more application operating on the IHS. Changes in the schedule context of the IHS may result in changes to the security state of the IHS. For instance, the detection of the IHS being operated at the location of a scheduled meeting may trigger the use of security policies that disable audio I/O capabilities of the IHS, thus preventing use of voice activated commands during this event and also preventing audio capabilities of the IHS to be used to maliciously or inadvertently reveal protected information. In this same manner, changes in calendar context that reports use of the IHS at a schedule event at a low-risk location may relax the use of certain security policies, such as policies that automatically require reauthentication or other identification of the user after a certain time interval of inactivity. In this same manner, changes in the calendar context that report use of the IHS for a remote event may trigger the use of security policies that enable use of certain components of the IHS, such as a camera.

In some embodiments, monitored contexts may include display information that is being reported by graphics controllers of the IHS, such as described with regard to FIG. 1. Changes in the display context of the IHS may result in changes to the security state of the IHS. For instance, the detection of the IHS being coupled an external monitor may trigger the use of security policies that enable the requirement for biometric authentication of the user. In other instances, the coupling of an external monitor may trigger the use of security policies that initiate screen blurring or other privacy capabilities when multiple individuals are detected in proximity to the IHS.

As indicated in FIG. 4, the participants 405 may report context information to an inference engine 410 of the platform framework 418. As described in additional detail below, based on reported context information, the inference engine 410 may determine a security state of the IHS, where the security state may be used to select a security policy that should be used in the operation of the hardware and software of the IHS. In some embodiments, the inference engine 410 may generate a security state classification for the IHS based on the received context information. In some instances, this security state classification may be reevaluated and updated as additional context information is received from participants 405. In this manner, the inference engine 410 may maintain an operative security state classification on an ongoing basis, where the operative security state is based on the most recent context information that has been received.

An additional type of context information that affects the security state of an IHS may be use of the IHS to access protected data or a protected software application. For instance, a user may select a spreadsheet, drawing, document or other file that has been designated as including protected data. A user may also initiate operation of an application that has been designated as protected, such as an accounting application or a security application. A user may also initiate operation of a containerized workspace, such as described with regard to FIG. 1, where the security classification of the data being accessed via the workspace maybe specified in a workspace definition received from a remote orchestrator and used to build and operate the workspace.

As indicated at 330 of FIG. 3, in some embodiments, a service of the platform framework may be initiated that monitors for a user accessing a file, application, workspace or other resource, and may also determine a security classification associated with the resource being accessed. Alternatively or additionally, as indicated at 455 of FIG. 4, in some embodiments, one or more registered participants 405 may monitor for files, applications, workspace or other resources being accessed. In such embodiments, these participants 405 may determine a resource is being accessed based on information provided by the operating system of the IHS, by an embedded controller, such as the described with regard to FIG. 1 of the IHS, and/or by hardware components of the IHS, such as from a storage controller of the IHS reporting a secure storage drive is being accessed. At 335, the platform framework or a framework participant detects a resource being launched, and in some cases may also determine a security classification associated with the resource based on metadata associated with a file, file type classifications, queries to a remote resource providing security applications for types of files and applications and/or based on security information provided in the workspace definition being used to operate a workspace.

At 460, a participant 405 monitoring for resources being accessed may notify the inference engine 410 of the platform framework of the detection of the resource that is being launched. In some instances, at 465 of FIG. 4 and at 340 of FIG. 3, the inference engine 410 may collect additional context information in response to the notification of the resource being launched. As described, the inference engine 410 may monitor and track certain context information on an ongoing basis, such as the location of the IHS, the networks to which the IHSs connected and the most recent user presence detection status that has been reported. Whereas some context information may change relatively infrequently, such as the location of the IHS or networks in use by the IHS, some context information may change more frequently, thus warranting the inference engine 410 determining updated context upon detection of a resource being launched. Accordingly, the inference engine 410 may request updates for certain context information, such as user presence detection status and calendar information that may be used to infer the present security state of the IHS.

In response to the reported accessing of a resource and based the context information that has been collected, at 470 of FIG. 4 and at 345 of FIG. 3, the inference engine determines a security state of the IHS. In some embodiments, a security state may be a classification of the security related status of the IHS, where the state reflects the security classification of the data and/or applications being accessed and also reflects the context in which the IHS is operating, such as the location of the IHS, user presence information, network information, the physical posture in which the IHS is configured, calendar information, etc. In some embodiments, security state classifications may be specified as a textual label, such as "protected," "highly protected," "confidential," "secret," "top secret," "proprietary," "highest," "high," "medium," "low," "open," etc. In some embodiments, security state classifications may be specified on a numerical scale, such as a numeric security score or a numeric threat level.

In some embodiments, a security state may be determined by the platform framework inference engine 410 based on a machine learning model that receives context information, including the file, application or resource that is being accessed, and generates a security state output. In some embodiments, such a machine learning model may be initially generated based on a manually generated model that specifies security state classifications for various contexts. For instance, a manually generated model may specify that in scenarios where a user accesses data classified as "secret," the security state is "high" for all locations other than a corporate location at which an IHS utilizes a secured network and only authorized individuals are present. Such a security state model may also specify that the security state is elevated to "highest," if the accessed data is designated as "top secret," regardless of the location of the IHS.

A manually generated security state model used by the inference engine 410 may be adapted and augmented over time based on machine learning techniques, where such changes to the security state model may be based on manual security settings made by a user. For instance, in a scenario where a user enables use of a video camera in conjunction with a calendared meeting, the security state model may be adapted to reduce the security state classification for such meeting contexts to a lower threat level that includes enabling the video camera of the IHS. In another scenario, a user attending a conference may enable various security settings, such as screen blurring and strict user presence detection requirements, while located in a conference area, while disabling such settings while in a private area, such as hotel room. In such a scenario, the security state model may be adapted to elevate the security state classification for the conference area location and a lowered security state classification in the hotel room location.

In some embodiments, a security state model utilized by a platform framework inference engine 410 may be represented as a finite state machine that specifies the various security states that are supported and the contexts that will trigger transitions between security states. In such embodiments, the finite state machine may be adapted and improved as new security states are added and new contexts are incorporated. For instance, in response to a new user presence detection capability being made available to an IHS, such as user presence detection that utilizes external xR sensors located within an area that has been configured for use in xR sessions, additional user presence detection transitions may be added to the finite state machine. For example, a "medium" security state classification that previously transitioned to "high" when a user is not detected within a ten-meter proximity to the IHS may instead remain at a medium security state if the user is detected as still being located within the xR area based on these xR sensors that are now being used for user presence detection.

As indicated in FIG. 4, upon the inference engine 410 making a security state classification, at 475, the security state may be provided to the platform framework core 415, which may in turn provide the security state determination to the security policy manager 420. For each supported security state determination, the policy manager 420 may maintain a mapping to a security policy, such as those described above, that specify hardware and/or software setting for the operation of the IHS while in that particular security state. For instance, a "highest" security state may be associated with a security policy that includes strict user presence detection requirements, such as requiring that a user that has been authorized based on biometric inputs must remain in close proximity to the IHS, or the displays of the IHS will be dimmed after thirty seconds of the IHS being unable to detect the user within this proximity. In other instances, a "corporate" security state associated with known work locations may be associated with a security policy that reduces restrictions such as user proximity requirements. At 350 of FIG. 3, a security policy that is associated with the current security state is determined.

As indicated at 480 of FIG. 4, the security policy manager 420 may then determine if the applicable security policy is different from the security policy that is currently in effect. If a change to the operative security policy has been made, at 485 of FIG. 4 and 355 of FIG. 3, the participants that have registered as users of the new security policy and users of the previous security policy are determined, where such determinations may be made by the policy manger 420 based on the previously described mapping of registrants to security policies that may be maintained by the policy manger. At 490, the identities of the registrants are provided to the platform framework core 415. At 495 of FIG. 4 and 360 of FIG. 3, the platform framework core 415 notifies the registrants of the security policy change.

At 365, the security policies are utilized by the registered participants 425 in the operation of the hardware and/or software of the IHS, such as the described utilization of the authentication, user presence detection, displays and other security capabilities of the IHS. As described, as operation of the IHS continues, various changes in context may occur as the IHS is operated. Accordingly, at 370 of FIG. 3, changes to the IHS context are monitored while use of the resource is ongoing. For instance, a portable IHS may move to a less secure location or may connect to a different network. User presence detection capabilities may determine an additional individual is in close proximity to the IHS. A calendar application may indicate that the time for a scheduled event has arrived, where the meeting attendees, location and/or agenda may indicate a change in the security state in which the IHS will be operated. Accordingly, based on a detected change in context, embodiments may return to 345, where an updated security state of the platform may be determined, thus resulting in identification of changes in security policies resulting from this context change.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a plurality of hardware devices, each operated at least in part according to one or more security policies and each operated by one or more registered participants of a platform framework;
   a processor; and
   a memory coupled to the processor, the memory having program instructions stored thereon that, upon execution, cause the platform framework of the IHS to:
   collect context information describing logical and physical environments in which the IHS is operating, wherein the context information is used to determine a security state for the IHS;
   detect a launch of a resource of the IHS;
   in response to the detected resource launch, collect updated context information further describing the logical and physical environments in which the IHS is operating;
   based on the security state, the launched resource and the updated context information, determine an updated security state for the IHS;
   based on the updated security state for the IHS, determine changes to one or more security policies that are used to operate the hardware devices of the IHS;
   identify platform framework participants that are registered users of the security polices affected by the changes resulting from the updated security state; and
   notify the identified platform framework participants of changes to the security policies that are to be used to operate the hardware devices of the IHS.

2. The IHS of claim 1, wherein the launched resource comprises at least one of a file and a software application.

3. The IHS of claim 1, wherein the launched resource comprises a containerized workspace.

4. The IHS of claim 1, wherein each respective security policy comprises a plurality of communication handles for use in notifying the identified platform framework participants of the changes to the security policy.

5. The IHS of claim 1, wherein the one or more security policies comprise a policy specifying a type of proximity determination that is utilized by user presence detection capabilities of the IHS.

6. The IHS of claim 5, wherein the plurality of hardware devices comprises a time-of-flight sensor, and wherein the proximity determination types comprise detecting an individual within a specified distance of the IHS using the time-of-flight sensor.

7. The IHS of claim 1, wherein the plurality of hardware devices comprises one or more displays, and wherein the one or more security policies comprise a policy specifying events that trigger a privacy capability of the one or more displays.

8. The IHS of claim 7, wherein the privacy capability that is triggered comprises at least one of dimming the one or more displays and blurring outputs of the one or more displays.

9. The IHS of claim 1, wherein the context information describing physical environments in which the IHS is operating comprises a location of the IHS.

10. The IHS of claim 9, wherein the one or more security policies comprise a policy specifying a plurality of networks that are required for use when the IHS is at the location.

11. The IHS of claim 9, wherein the one or more security policies comprise a policy specifying a requirement for user presence detection capabilities of the IHS to require biometric identification of a user when the IHS is at the location.

12. The IHS of claim 9, wherein the one or more security policies comprise a policy disabling one or more I/O ports of the IHS when the IHS is at the location.

13. The IHS of claim 9, wherein the one or more security policies comprise a policy enabling a camera of the IHS when the IHS is at the location of a scheduled event.

14. The IHS of claim 1, wherein the context information describing physical environments in which the IHS is operating comprises operation of the IHS at the location of a scheduled event.

15. The IHS of claim 1, wherein the context information describing physical environments in which the IHS is operating comprises operation of the IHS using an external monitor and further comprises detection of multiple individuals in proximity to the IHS, and wherein the one or more security policies comprise a policy that initiates a privacy capability of the IHS.

16. A memory storage device having program instructions stored thereon that, upon execution by an Information Handling System (IHS), cause the IHS to:
   collect context information describing logical and physical environments in which the IHS is operating, wherein the context information is used to determine a security state for the IHS;
   detect a launch of a resource of the IHS;
   in response to the detected resource launch, collect updated context information further describing the logical and physical environments in which the IHS is operating;
   based on the security state, the launched resource and the updated context information, determine an updated security state for the IHS;

based on the updated security state for the IHS, determine changes to one or more security policies that are used to operate hardware devices of the IHS;

identify platform framework participants that are registered users of the security polices affected by the changes resulting from the updated security state; and notify the identified platform framework participants of changes to the security policies that are to be used to operate the hardware devices of the IHS.

17. The memory storage device of claim 16, wherein the launched resource comprises at least one of a file and a software application.

18. The memory storage device of claim 16, wherein the launched resource comprises a containerized workspace.

19. A method, comprising:

collecting context information describing logical and physical environments in which an IHS (Information Handling System) is operating, wherein the context information is used to determine a security state for the IHS;

detecting a launch of a resource of the IHS;

in response to the detected resource launch, collecting updated context information further describing the logical and physical environments in which the IHS is operating;

based on the security state, the launched resource and the updated context information, determining an updated security state for the IHS;

based on the updated security state for the IHS, determining changes to one or more security policies that are used to operate hardware devices of the IHS;

identifying platform framework participants that are registered users of the security polices affected by the changes resulting from the updated security state; and notifying the identified platform framework participants of changes to the security policies that are to be used to operate the hardware devices of the IHS.

20. The method of claim 19, wherein the launched resource comprises at least one of a file and a software application.

* * * * *